March 30, 1926.                C. M. CLEMENT                1,578,714
                               TIRE PROTECTOR
                              Filed April 13, 1925
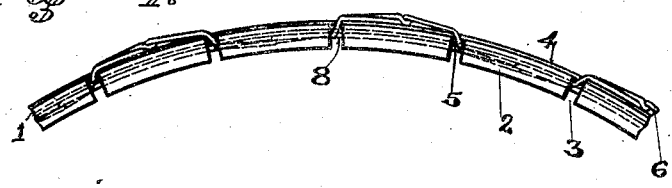
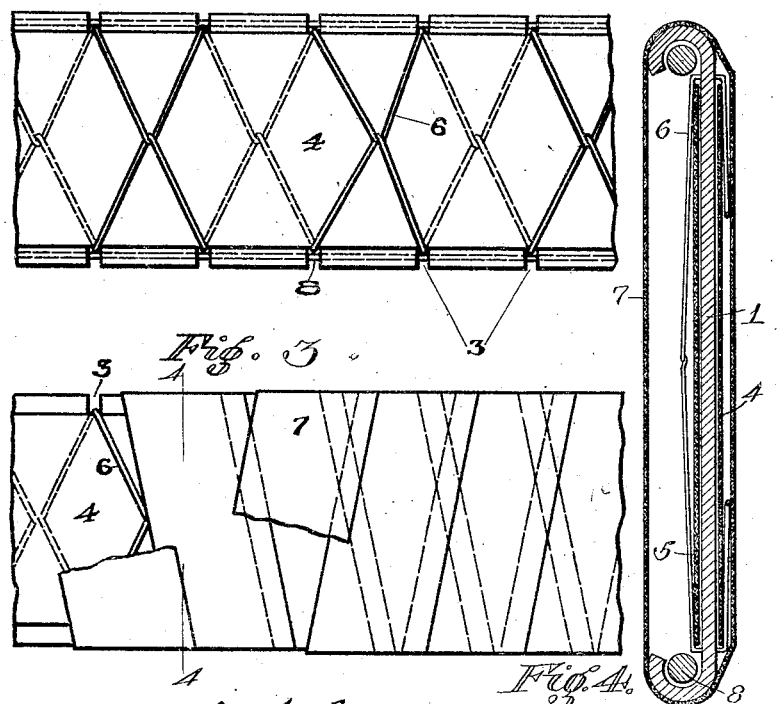
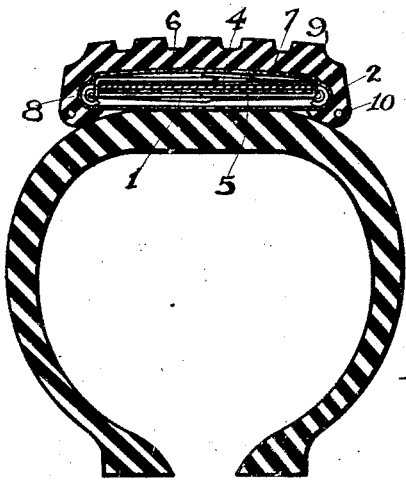
INVENTOR
Charles M. Clement
BY
J. E. Trabucco
ATTORNEY Patented Mar. 30, 1926.

1,578,714

UNITED STATES PATENT OFFICE.

CHARLES M. CLEMENT, OF SAN RAFAEL, CALIFORNIA.

TIRE PROTECTOR.

Application filed April 13, 1925. Serial No. 22,601.

*To all whom it may concern:*

Be it known that I, CHARLES M. CLEMENT, a citizen of the United States, residing at San Rafael, in the county of Marin and State of California, have invented new and useful Improvements in Tire Protectors, of which the following is a specification.

This invention relates to tire protectors of the type adapted to be used on pneumatic tires, and has for its principal object to provide an armor protector for tires which may be easily applied thereto.

Another object of this invention is to provide a protector for pneumatic tires, which when applied, prevents puncture and wear of the tires.

A further object of this invention is to provide an armor tire protector, easily applied to a pneumatic tire, and particularly adapted for preventing punctures and wear of the tire.

My invention consists in the novel features of construction hereinafter described, illustrated in the accompanying drawings, and particularly pointed out in the appended claims.

In the drawings:

Fig. 1 is a side view of the metallic band, showing the manner in which it is constructed with the wire lacing affixed thereto;

Fig. 2 is a top view corresponding to Fig. 1;

Fig. 3 is a top view of the metallic band, showing the wire lacing and the fabric wrapped around the same;

Fig. 4 is an enlarged cross-section taken on the line 4—4 of Fig. 3;

Fig. 5 is a cross-section of a pneumatic tire with the tire protector applied thereto.

Referring to the drawings, the numeral 1 represents a metallic band constructed from brass or other suitable material, having its edges 2 turned under with slots 3 cut therein. The metallic band is circular in shape and is adapted to encircle the pneumatic tire upon which it is applied. Extending circumferentially around the outer surface of metallic band 1 is a fabric layer 4, and extending circumferentially around the inside surface of the said band is a similar fabric layer 5. The fabric layers 4 and 5 are held against the outer and inner surfaces of the band by means of a wire 6 which is laced over and across the same and through the slots 3 of the metallic band 1. Over the metallic band 1, the fabric layers 4 and 5 and the wire 6, are wrapped layers of fabric 7, one of the last named layers being wrapped diagonally across the band 1 in one direction and the other of said fabric layers being wrapped in another direction diagonally across the band over the first mentioned fabric layer wrapping. Through the turned under edges 2 of band 1, are wire rings 8, circular in form and adapted to extend completely around the pneumatic tire inside the turned under edges. The wire rings 8 are constructed from strong material and are adapted to hold the band 1, in position on the pneumatic tire. Vulcanized over the outer surface of the fabric layer 7, is a resilient material 9, formed in such a manner as to form a tread for the protector. Near the outer edges of the resilient material are wires 10, extending circumferentially around the tire inside the said material 9. The wires 10 serve to keep the protector and its tread in shape and in the proper position on the pneumatic tire.

The entire protector may be put on a pneumatic tire by deflating the same and placing it over the tread; then by inflation the tire casing will be forced firmly against the fabric wrappings and the inside surface of the protector thereby causing the protector to be firmly held on the tread of the pneumatic tire.

Although I have shown but one form of my improved tire protector, it is evident the same may be constructed within a pneumatic tire and serve the same purpose as the protector disclosed; I therefore do not desire to be limited to the exact construction herein shown and described, it being understood that certain changes may be made which are within the scope of the appended claims.

What I claim is:

1. A tire protector comprising in combination, a metal band adapted to encircle a tire having its edges turned under, a pair of wire rings fitting inside the turned under edges of the metal band, a pair of encircling layers of fabric located on the outside and inside surface of the metal band between the turned under the edges thereof, a wire lacing extending over the layers of fabric and across the metal band, a cloth wrapping extending transversely over the metal band, wire lacing and layers of fabric, and a resilient substance attached to the outer surface of the cloth.

2. A tire protector comprising a metallic encircling band having its edges turned under, a pair of encircling wire rings located inside the turned under edges of the band, a layer of fabric encircling the band, a wire lacing extending transversely across the band and over the fabric layer, whereby the fabric layer is held in position on the band, another layer of fabric extending transversely around the band and over the first mentioned layer of fabric and wire lacing, and a resilient substance attached to the outer surface of the last mentioned layer of fabric.

CHARLES M. CLEMENT.